United States Patent [19]
Burnett

[11] 3,729,042
[45] Apr. 24, 1973

[54] APPARATUS FOR SEPARATING POLLUTANTS AND OBTAINING SEPARATE LIQUIDS & SOLIDS

[75] Inventor: Henry J. Burnett, West Hartford, Conn.

[73] Assignee: Pollutant Separation Inc., Elmwood, Conn.

[22] Filed: Feb. 22, 1971

[21] Appl. No.: 117,620

[52] U.S. Cl. ........................ 159/2, 159/1 R, 159/44, 159/46, 159/DIG. 26, 202/180, 202/181, 202/179, 202/198, 202/233, 203/88, 203/100
[51] Int. Cl. ......... B01d 1/28, B01d 3/42, B01d 1/00, B01d 3/14, B01d 3/00, B01d 3/06
[58] Field of Search ........................ 159/1–3, 159/DIG. 26, DIG. 1, DIG. 24; 202/176, 177, 179, 180, 185, 195, 197, 205, 181, 182; 203/22, 23, 27, 88, 91, 100, 11

[56] References Cited

UNITED STATES PATENTS

| 2,060,039 | 11/1936 | Clapp | 219/10.65 |
|---|---|---|---|
| 2,572,321 | 10/1951 | Deanesly | 159/47 |
| 2,925,127 | 2/1960 | Sargent et al. | 159/2 R |
| 3,234,994 | 2/1966 | Dance | 159/2 R |
| 3,323,575 | 6/1967 | Greenfield | 203/100 X |
| 3,361,648 | 1/1968 | Brown et al. | 203/11 |
| 3,388,230 | 6/1968 | Cunningham et al. | 219/10.51 |
| 3,545,518 | 12/1970 | Kohlmann | 159/2 R |

Primary Examiner—Norman Yudkoff
Assistant Examiner—J. Sofer
Attorney—Louis V. Lucia

[57] ABSTRACT

An apparatus for and method of sterilizing and separating solids from liquids in a slurry of sewage wherein said slurry is heated under a high pressure to a high temperature and then released into a low pressure atmosphere whereby the liquids in said heated slurry will burst into a vapor and the solids will be reduced to a fine powder for non-polluting disposal.

4 Claims, 1 Drawing Figure

Patented April 24, 1973
3,729,042
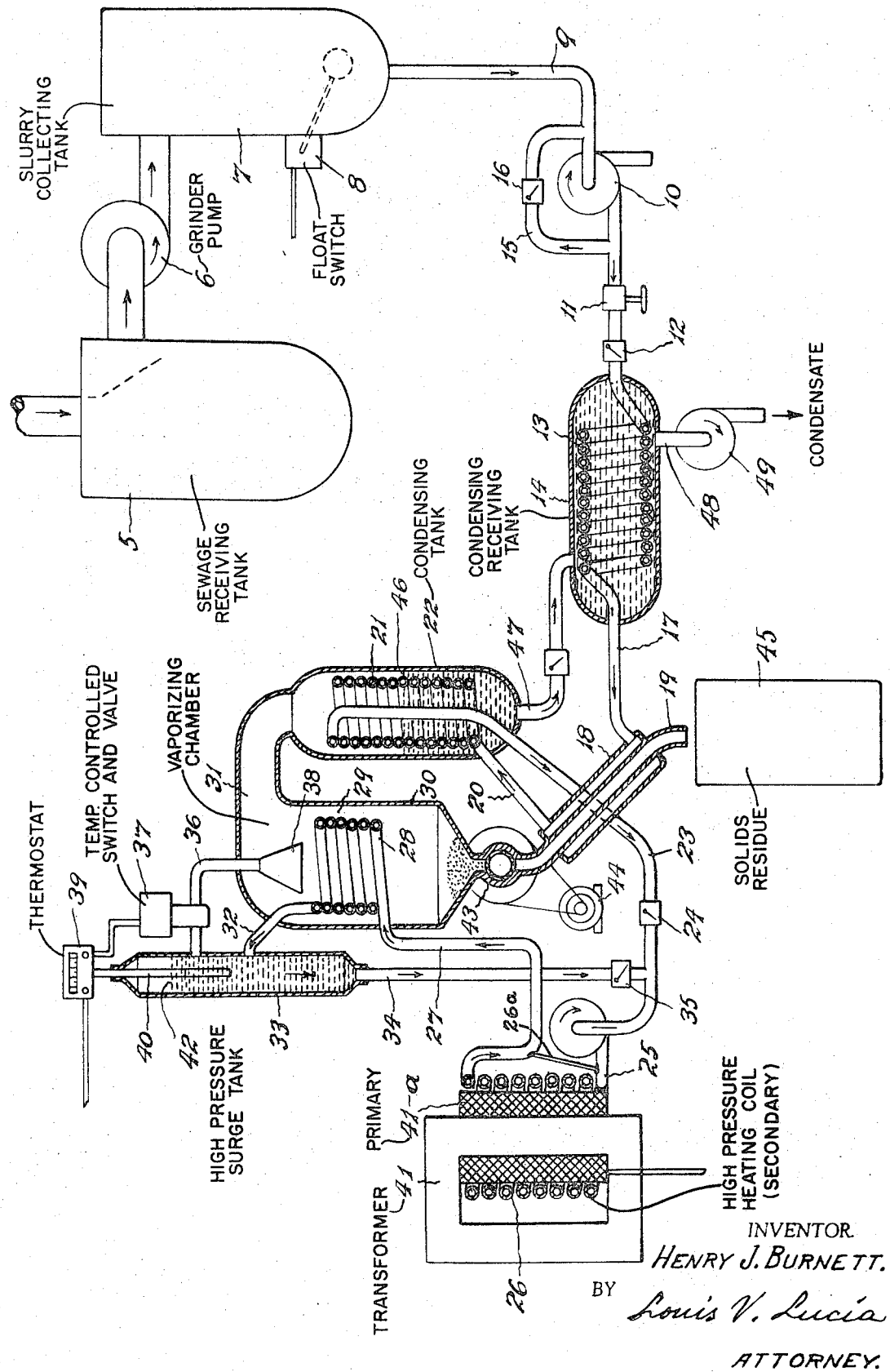
INVENTOR.
HENRY J. BURNETT.
BY
Louis V. Lucia
ATTORNEY.

APPARATUS FOR SEPARATING POLLUTANTS AND OBTAINING SEPARATE LIQUIDS & SOLIDS

BACKGROUND OF THE INVENTION

It is well known that, heretofore, various methods have been used for sterilizing sewage and separating solids from the liquids therein by letting the solids settle to the bottom in large tanks and the liquids run off or evaporate. The settled solids are then dried and ground into a condition for disposal. Such previous methods, however, have required vast amounts of space, such as for drying areas, in addition to the necessary apparatus, and therefore are suitable only for treating such as municipal sewage and the like.

SUMMARY OF THE INVENTION

The present invention relates to a method of and apparatus for sterilizing and separating pollutants from liquids and utilizes electrical induction heating means, such as described in my U.S. Pat. No. 3,477,359 dated Nov. 11, 1969, for heating a slurry of polluting liquids and solids under high pressure to a high sterilizing temperature far above the boiling point of liquids at sea level to thoroughly sterilize the slurry and reduce the pollutants to a non-polluting state.

BRIEF DESCRIPTION OF THE INVENTION

It is an object of this invention to provide a method and apparatus for treating sewage which will require a small amount of space so that it can be used on ships and in buildings and even on vessels smaller than ships where the separated sterilized liquids, such as water, can be easily disposed of over the side and the residue from the solids are reduced to the state of a sterile fine powder which can be easily stored in containers for later disposal on land or even used as a fertilizer, so that it will not be necessary to dump the said residue into the waters where it could cause pollution.

A further object of this invention is to provide a novel method and apparatus for heating sewage to a high temperature to sterilize said sewage and separate the solids from the liquids therein without causing air pollution.

Further objects and advantages of this invention will be more clearly understood from the following description and the accompanying drawing.

DESCRIPTION OF THE INVENTION

As shown in said drawing, my improved apparatus is illustrated partly in section and diagrammatically in a form which is particularly suited for ships and the like and which includes a sewage receiving tank 5 in which raw sewage is received from such as toilets, galleys and laundries throughout the ship.

A grinder pump 6 takes the raw sewage of liquids and solids from said receiving tank, grinds it into a slurry collecting tank 7 which is provided with a float operated electric switch 8 for controlling the operation of the apparatus. From said collecting tank, the slurry is drawn through the cold slurry inlet pipe 9 by a high pressure pump 10 and forced, through a flow rate control valve 11 and a check valve 12 into a coiled pipe 13 in a heat transfer and condensate tank 14. A by-pass pipe 15, having a check valve 16, is provided to by-pass the slurry from the pipe 9 which is held back by the flow rate controlling valve 11. From the coiled pipe 13, the slurry is forced through the pipe 17 into a heat transfer jacket 18 which surrounds the solids residue discharge pipe 19.

From said jacket, the slurry passes through the pipe 20 to the heat transfer coiled pipe 21, that is contained with the condensing tank 22, and from said coiled pipe through the pipe 23 and the check valve 24 therein to the high velocity circulating pump 25. This pump forces the slurry through the high pressure heating pipe coil 26 and then through the pipe 27 into the high pressure high temperature pipe coil that is contained within a vaporizing chamber 29 in a vaporizing tank 30 that is connected, through a vapor duct 31, to the condensing tank 22.

From said high pressure high temperature coil 28, the slurry is forced through the pipe 32 into the closed high pressure surge tank 33 which is connected to the pipe 23 by a re-circulating pipe 34 having a check valve 35 therein.

The said surge tank is also connected to the vaporizing tank 30 by a pipe 36 which extends through a motor-controlled valve 37 and has a suitable nozzle 38 for spraying the highly heated slurry into the vaporizing chamber 29; said valve 37 being controlled by a suitable adjustable thermostat 39 which has a thermocouple probe 40 that extends into the slurry in the surge tank and is responsive to the temperature thereof to control the operation of the thermostat for causing operation of the valve.

The pipe coil 26 forms a short circuited secondary coil by means of a short circuiting rod 26a, which coil is insulated from and surrounds the primary coil 41a of an electric transformer 41 and the said pipe coil is thereby heated by electrical conduction.

It is well known that water can be heated to 706° F. under a pressure of approximately 3,250 psi. However, in the use of my improved method and apparatus the slurry is forced into the pipe system of the apparatus by the pump 10 with a pressure on the order of 4,000 psi, in order to maintain at least the 3,250 psi required, and said pressure is maintained in said system by means of the temperature controlled switch 37.

The slurry is then heated under said pressure within the pipe coil 26 by the electrical induction in the transformer 41 and circulated through the pipe coils 26 and 28 and the surge tank 33 by the pump 25; said slurry reaching the level indicated at 42 in the closed surge tank and leaving an air cushion in the space above said level.

Due to the slurry being under the high pressure of 4,000 psi, it is heated in the pipe coil 26 to a temperature far above the boiling point and the thermostat 39 is set to open the valve 37 when the slurry in said surge tank reaches a temperature on the order of 706° F., which is the critical temperature at which the aqueous portion of the slurry will completely vaporize, the slurry will be forced, by the 4,000 psi pressure, through the pipe 36 and the nozzle 38 into the low pressure vaporizing chamber 29 wherein the pressure is substantially lower. This sudden release of the highly heated slurry from the high pressure of the surge tank into the low pressure of the vaporizing chamber will cause the liquids in the slurry to rapidly expand, or burst, into a vapor which will separate from the solids in the slurry and the said solids will then precipitate about the highly heated pipe coil 28 in the form of fine dust which is then thoroughly dried, by the heat from said coil, and settles on the bottom of the tank 30 where it can accumulate.

In order to empty said dust from the tank 30, there may be provided a suitable measuring valve 43 which is rotated by a motor 44 to successively open an opening in the bottom of the tank 30, receive a measure of the dust, close said opening, empty the dust into the discharge pipe 19 and then close off said pipe, before again opening the tank opening, to thereby prevent the dust from being forcibly blown out of the outlet pipe as the slurry bursts in the vaporizing chamber and to retain any vacuum that may be in said chamber; the said discharge pipe being cooled by the cold slurry passing through the jacket 18 and angled to thereby contact and cool the dust as it slides down said pipe, from which it may be emptied into a suitable receptacle 45 for later disposal.

The vapor resulting from the rapid expansion of the liquids will be forced, by the pressure entering the chamber 29 with the highly heated slurry, through the duct 31 into the tank 22 wherein it will be cooled by heat transfer to the incoming slurry in the pipe coil 21 and said vapor will then condense into water in said tank 22 to approximately the water line indicated at 46.

From the tank 42, the water, which is still hot, will pass, through the return pipe 47, into the tank 14 wherein it will transfer its heat to the cold incoming slurry in the pipe coil 13 and the cooled water will then empty from the tank 14 through the cold water outlet pipe 48. If desired, a suction pump 49 may be provided in said outlet pipe to further reduce the pressure in the vaporizing chamber to below atmospheric and thereby increase the rapid expansion of the hot slurry as it enters the said chamber.

My improved apparatus provides for regenerative heating of the slurry by means of heat transfer from the hot vapors, condensate therefrom and separated solids passing out through the tanks 22 and 14 in the outlet pipe 19., 19, the cold slurry entering the apparatus through the pipe coil 13, the jacket 18 and the pipe coil 28; thereby greatly reducing the amount of electric current used for heating the slurry to the high temperature required in the surge tank to cause the vaporization of the liquids as above described as the highly heated slurry is released from the high pressure in said tank to the low pressure in the vaporization chamber.

I claim:

1. Apparatus for treating raw sewage to sterilize and separate the solids from the liquids therein for non-polluting disposal of said sewage, said apparatus including a sewage receiving tank for receiving raw sewage, a collecting tank, a grinding pump for grinding said sewage into a slurry and transferring it from said sewage receiving tank into the collecting tank, a float switch in said collecting tank for preventing operation of said apparatus upon the absence of slurry in the collecting tank, a condensate receiving tank, a vapor condensing tank discharging into and connected to said condensate receiving tank, a vaporizing tank having a low pressure vaporizing chamber connected to said condensing tank, a closed high pressure surge tank, an electric transformer, a series of connected pipe coils including one in each of said condensate receiving and condensing tanks, a short circuited, sewage heating pipe coil forming the secondary coil of said transformer to be heated by electrical induction and connected in said series, a high heat coil in said vaporizing chamber also connected in said series, as well as connected to said surge tank, a high pressure pump for forcing slurry from the collecting tank through said pipe coils into said surge tank under high pressure, said slurry being heated to a high temperature under high pressure while passing through said heating pipe coil, a connecting pipe between said surge tank and vaporizing chamber, and a valve in said connecting pipe operable upon the slurry in said surge tank reaching a predetermined high temperature to release the heated slurry from the high pressure in the surge tank to the low pressure in the vaporizing chamber and thereby cause rapid vaporization of the liquids in said slurry and separation of the solids therefrom; the condensate from the vapors of said liquids being discharged through the said condensing and condensate receiving tank and thereby preheating the incoming slurry passing through the pipe coils in said tanks before being heated to a high temperature by said heating coil.

2. Apparatus as set forth in claim 1 including a pump for circulating the highly heated slurry through the heating coil, the high heat coil in the vaporizing chamber and the surge tank.

3. Apparatus as set forth in claim 1 including a discharge pipe for the residue from the separated solids in the vaporizing chamber and a measuring valve for said residue between said chamber and pipe.

4. Apparatus as set forth in claim 1 including a discharge pipe for the hot residue from said vaporizing chamber, and a jacket surrounding said pipe for preheating the incoming slurry by heat transferred from said pipe.

* * * * *